United States Patent [19]

Carter et al.

[11] Patent Number: 4,582,441
[45] Date of Patent: Apr. 15, 1986

[54] TEXT EDITING WITH VOICE PROMPTING

[75] Inventors: William A. Carter; Randal H. Cecil; Joseph C. Tremoulet, all of Lexington, Ky.

[73] Assignee: International Business Machines Corporation, Armonk, N.Y.

[21] Appl. No.: 643,205

[22] Filed: Aug. 22, 1984

[51] Int. Cl.[4] .............................................. B41J 29/46
[52] U.S. Cl. ..................................... 400/712; 400/63; 400/86
[58] Field of Search .................... 400/63, 86, 712, 61, 400/279, 70; 364/900 MS File

[56] References Cited

U.S. PATENT DOCUMENTS 3,630,336 12/1971 Johnson et al. ................ 400/306 X

FOREIGN PATENT DOCUMENTS 131585 8/1982 Japan ..................................... 400/86

OTHER PUBLICATIONS

*IBM Tech. Disc. Bulletin*, by D. A. Stockwell, vol. 24, No. 8, Jan. 1982, p. 4308.
*IBM Tech. Disc. Bulletin*, by V. G. Golding et al., vol. 26, No. 10B, Mar. 1984, pp. 5633–5636.

Primary Examiner—Paul T. Sewell
Attorney, Agent, or Firm—Laurence R. Letson

[57] ABSTRACT

An electronic typewriter or other keyboard entry display device may have a voice or audio prompt option incorporated therein. The option provides for the operator to record a series of commands to position the print point as desired and then to code a series of characters spelling the word or words to be vocalized as a prompt. The recorded commands and the prompt may subsequently be played back to position the print point at a desired position on the page and the prompt vocalized to instruct the operator the nature of the entry for that position.

20 Claims, 9 Drawing Figures

FIG. 6

KEYSTROKE SEQUENCE FOR STORING EXAMPLE:
    STORE +1,CR,CR,CR,CODE +9, D,A,T,E,CR,
    CR, CODE +9, S,H,I,P,Ƅ,T,O,CR,
    CR,CR,CR,CODE +9, Q,U,A,N,T,I,T,Y,CR,
    TAB,CODE +9, D,E,S,C,R,I,P,T,I,O,N,CR,
    TAB,CODE +9, W,E,I,G,H,T, CR,
    TAB,CODE +9, U,N,I,T,Ƅ,P,R,I,C,E,CR,
    TAB,CODE +9, T,O,T,A,L,CR,........, STORE

FIG. 7

CONTENTS OF DOCUMENT 1:
    CR,CR,CR, ANNOTATED STOP CODE, D,A,T,E, STOP CODE,
    CR, ANNOTATED STOP CODE, S,H,I,P,Ƅ,T,O,STOP CODE,

TAB,ANNOTATED STOP CODE,T,O,T,A,L, STOP CODE, ........,END OF DOCUMENT CODE

FIG. 8

PLAYBACK SEQUENCE:

| OPERATOR TYPES: | MACHINE RESPONSE |
|---|---|
| EXAMPLE → PLAY +1 | CR,CR,CR, PRINTED ;"DATE"VOICED; |
| 6,/,1,/,8,4 | 6/1/84 PRINTED |
| PLAY | CR PRINTED ;"SHIP TO"VOICED; |
| EXAMPLE → B,L,D,G,Ƅ,1,0 | BLDG Ƅ 10 PRINTED |
| PLAY | CR,CR,CR, PRINTED ;"QUANTITY" VOICED |
| EXAMPLE → 5 | 5 PRINTED |
| PLAY | TAB PRINTED ;"DESCRIPTION"VOICED |

4,582,441

TEXT EDITING WITH VOICE PROMPTING

FIELD OF THE INVENTION

This invention relates to text processing amd more particularly to text processing with the aid of prompting for the operator in the form of a verbal command or voice prompts.

BACKGROUND OF THE INVENTION

The use of prompts with respect to word processing equipment and data entry terminals is well known and has been used for a considerable length of time. Most prompts with respect to word processing equipment utilizing a display or a video display tube to display the information, take the form of menus from which the operator may choose or printed prompts on the display. Such menu prompts in individual or menu form are predominantly found on terminals and computer displays.

Voice response or questioning or prompting has been used on educational machines such as machines which make statements or which ask questions illiciting a response from a student.

More recently, voice prompting has found its way into automobiles in the form of a vocalized or verbalized command such as "fasten seat belts" when a certain sequence of events occurs. The sequence of events would typically be when the ignition key is inserted into the ignition switch of the automobile and turned to an on position.

Some voice prompting has been utilized in airplanes where certain flight conditions which are considered to be unsafe will trigger the voice synthesizer to command the aircraft pilot to execute a particular maneuver such as the command "pull up" if the aircraft is below a predesignated flight path altitude. In all instances, the prompts are triggered by an operation or by the existence of predetermined conditions. The prompts are preloaded and are selected by the apparatus to respond to a particular condition. The prompts are not programmable by the operator nor are they selectable by the operator such that the operator gets a desired prompt at a particular point in a sequence of events.

Prior art typewriters without an auxiliary display do not have the capability of prompting as an aid to the operator. The operator of the typewriter must observe where the print point of the typewriter is located and then make the appropriate entry based upon the recognition of what type of material is relevant at that point. For example, when filling out a form, the print point will be positioned over a field on the form which would contain the date of the document. The operator must observe that the print point is in that position and then type the date based upon the recognition of the position of the print point relative to the form.

The typing of forms, with many different positions that must be accessed during the typing, is a particularly slow job due to the need to keep referring to the location of the print point visually. This interrupts the normal keying of an operator who can otherwise merely watch the page of the material to be typed.

Electronic typewriters are presently available on the market, and have been for some time, which have the capability of storing of texts of varying lengths electronically and the stored texts may be recalled at a later time for playout. Movement commands such as carrier return, index, tabulation and spacing may be stored, as well as characters for textual purposes.

SUMMARY OF THE INVENTION

Typewriters with text storage capability may serve as a basis for the improvement described herein. Typewriters which are most conveniently utilized in the environment of this improvement are those which have either document or phrase storage capability where text may be recorded and commands then given to the typewriter to cause the playback of the recorded text.

Included in the storage under a designated document or phrase identifier may be commands to properly position the printhead. The improvement on such a state of the art typewriter includes the utilization of an annotated stop code which will serve to cause the typewriter or output device to be disabled from its normal printing or displaying mode as the keyboard is operated. The apparatus shifts to a mode of operation wherein information is keyed into the keyboard to identify the particular prompt which may then be vocalized by a voice synthesizer.

The word or words to be vocalized are loaded from a keyboard by the operator immediately following the annotated stop code being entered. After the prompt word or words, forming the annotation, is loaded and the annotation is terminated, the annotation is stored for future playback.

The annotated stop code, in combination with movement commands and additional annotated stop codes, will form the basis for the operation of the typewriter or keyboard entry display device and the voice prompting of the operator.

After all the prompts and the appropriate commands to position the print point at desired points on the form or page have been loaded in the appropriate sequence, the phrase or document comprising the movement commands and the annotated stop codes can be played. The carrier of the printer or the print point indicator will then retrace the previously loaded sequence until an annotated stop code is encountered. When the annotated stop code is encountered, the printer will cease movement of the print point and the speech synthesis unit will then vocalize the prompt associated with that location on the page. The typewriter or other keyboard entry device will then accept keyed data from the operator so that the form may be appropriately filled out. After entry of the variable data, the playing of the document previously stored may be resumed until the next annotated stop code is encountered. At this point, additional variable information may be keyed by the operator. This sequence may then be repeated until the entire form has been completed. This allows the operator to hear a prompt which assures that the print point is in the appropriate position and eyes may remain on the source data. As the source data is copied, visual continuity therewith may be maintained for a much more efficient input into the typewriter.

DRAWINGS

FIG. 6 is the keystroke sequence for storing the document and prompts.

FIG. 7 is an illustration representing the contents of the document stored under the designation document 1.

FIG. 8 is the playback sequence, both from an operator command standpoint and the machine operation standpoint for playing stored contents of document 1.

DETAILED DESCRIPTION

Figure 1:
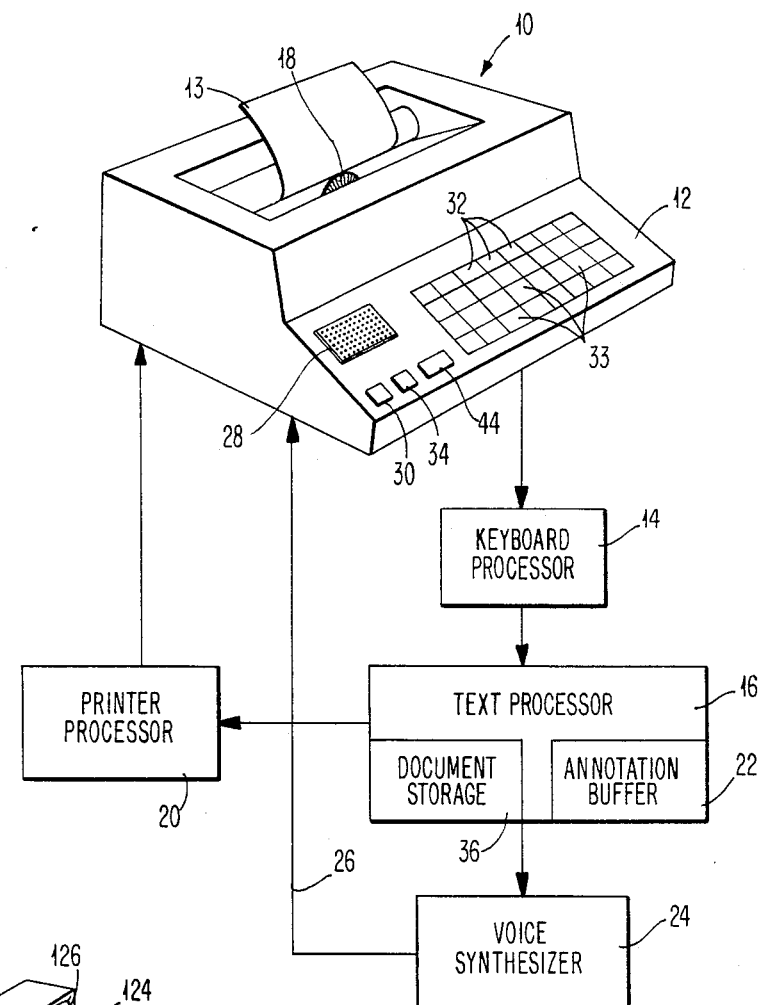
FIG. 1 is an illustration of a typewriter with the electronic controls therefor illustrated in block diagram.

Referring to FIG. 1, typewriter 10 is an electronic typewriter wherein the keyboard 12 generates electrical signals representing key positions where electrical contacts are made in response to the operator input. Keyboard 12 then transmits key position signals indicating a character selection to the keyboard processor 14. The keyboard processor 14 is conventional on electronic typewriters and receives the signals from the keyboard 12, translating those signals into codes representing a character or a command. A character is that keybutton depression which means that a selected letter or number or other symbol is to be printed by the typewriter 10. A command is a signal indicating that the typewriter 10 is to cause some action to happen, for example, a tabulation, carrier return, paper index, backspace, space, or some other function which does not involve the printing of a character on the record medium 13. Once the keyboard processor 14 has captured and decoded the signals from the keyboard 12 and passed the character identifying code to the text processor 16, the code is then ready for processing.

The text processor 16 is responsible for and performs the functions necessary to cause the decoding of the keyboard processor output, storing and organizing of the text, and the sending of commands corresponding to the characters to be printed to the print processor along with the necessary commands for escapement movements, paper movements and other mechanical operations required in the printer. The print processor 20 receives these signals from the text processor 16 and then organizes the sequence in which the commands are to be sent to the appropriate elements of the printer 18.

Depending upon the capabilities and the capacities of the microprocessors selected, the keyboard processor 12, text processor 14 and printer processor 20 may be combined into one or several processors. The design is a matter of choice. The description will be made with respect to the three processors being separate, distinct microprocessors, each performing their own range of functions, for simplicity.

The text processor 16 also is primarily responsible for controlling the play out of previously recorded segments of text commands. Text commands comprise characters and the necessary function instructions or function codes to cause the printer to move or shift in the appropriate directions as well as to cause the print processor 20 to select the appropriate character in response to signals from the text processor 16.

The text processor 16 also contains, among others, an annotation buffer 22. The annotation buffer 22 is utilized to accumulate binary bytes which will define the word which is to be vocalized by a voice synthesizer 24. The voice synthesizer is a device which will cause vibrations to be emitted from a speaker 28 which approximate the frequencies of a human voice speaking a word. The control of the speaker 28 is accomplished from a microprocessor contained within the voice synthesizer 24. The voice synthesizer 24 receives a data string of bytes representing letters which, when considered in its totality, will define the word or words to be vocalized.

Two different types of voice synthesizers 24 are available. One type has a limited predetermined vocabulary which may be triggered by discrete combinations of data bytes while the second type of synthesizer is capable of constructing the vocalized speech based upon rules programmed into the microprocessor contained therein. The limited preset vocabulary type is exemplified by the TMS 5100 voice synthesis processor with a VM 71002 vocabulary ROM, from Texas Instruments, Inc. The word construction type synthesizer is exemplified by the Votrox Personal Speech System from Votrax of Troy, Mich.

The data bytes provided to this second type of voice synthesizer will represent the word to be vocalized but the instructions for controlling the speaker are not preloaded with respect to that specific word. The instructions for controlling the speaker 28 are derived according to the rules of speech construction which have been placed into the microprocessor storage of the voice synthesizer 24.

For purposes of illustration, the voice synthesizer 24 will be described as one of the type which has the capability to construct the vocalizations in response to the data inputs. It should be recognized that the voice synthesizer which actually constructs the speech from a relatively unlimited input will operate in substantially the same manner as a limited vocabulary synthesizer with respect to the remainder of the system, and may be preferred from a flexibility standpoint but may be cost prohibitive from some categories of typewriters.

The voice synthesizer 24 is connected to speaker 28 by output line 26. The speaker 28 may be conveniently located at any location in the typewriter 10 or externally which will afford the ability to be understood by the operator in the normal operator position and at the same time not provide such a distractive output that others in the immediate area will be disturbed.

An electronic typewriter containing a keyboard processor function, a text processor function and a printer processor function is the IBM Electronic Typewriter 85 and the IBM Electronic Typewriter 95, sold by the International Business Machines Corporation, Armonk, N.Y.

Both of these typewriters are commercially available and therefore detailed description with respect to the precise programming and structure of the electronic microprocessors and electronic controls therein is not necessary for an understanding of this disclosed invention.

A further example of phrase storage capabilities in a typewriter is disclosed in U.S. Pat. No. 4,215,422 to W. R. McCray et al, assigned to International Business Machines Corporation, Armonk, N.Y.

The basic typewriter 10 has the capability of storing a document for later playback. For example, in the IBM Electronic Typewriter 85 or 95, this is accomplished by the depression of a STORE key 30 and the simultaneous depression of a number key 32 or letter key 33 to identify the document. Any keystrokes entered thereafter from the keyboard 12 will be stored in addition to being used to operate the typewriter in its normal and customary operation. At the end of the document which has been entered as described above, an end of document code is entered from keyboard 12 to indicate to the text processor 16 that the end of the document has been reached and that no further keyboard inputs should be stored in that memory segment. This end of document designation is indicated to the text processor by the depression of the STORE key 30.

Word processors with keyboard input and video or other electronic display may use this invention even if the printing of the document is not directly a result of individual key depression. Word processors are adapted to storing text inputs from keyboard entry and the recall of such stored text, and thus would be readily adapted to the use of the subject invention in connection with audio prompting in conjunction with the cursor position or entry point on the display, which is fully analogous to the print point of a typewriter. The word processor controls and executes the movement of the cursor or display point relative to the display.

When a document is to be played from memory, the document is defined by pressing the PLAY key 34 and a number key 32 or letter key 33 to indicate that a playout is required and identify which of the stored documents is to be played. Upon the release of all the keys 34, 32, or 33 which have been depressed, play will be initiated causing the typewriter to reproduce the printer operations which have been previously entered and stored in the designated document.

When it is desired by the operator to store a document and at the same time to load appropriate voice prompts for that document, the typewriter is placed in a store mode by the depression of the store key 30 and the simultaneous depression of a numerical or letter designation using keys 32 or 33.

Figure 5:
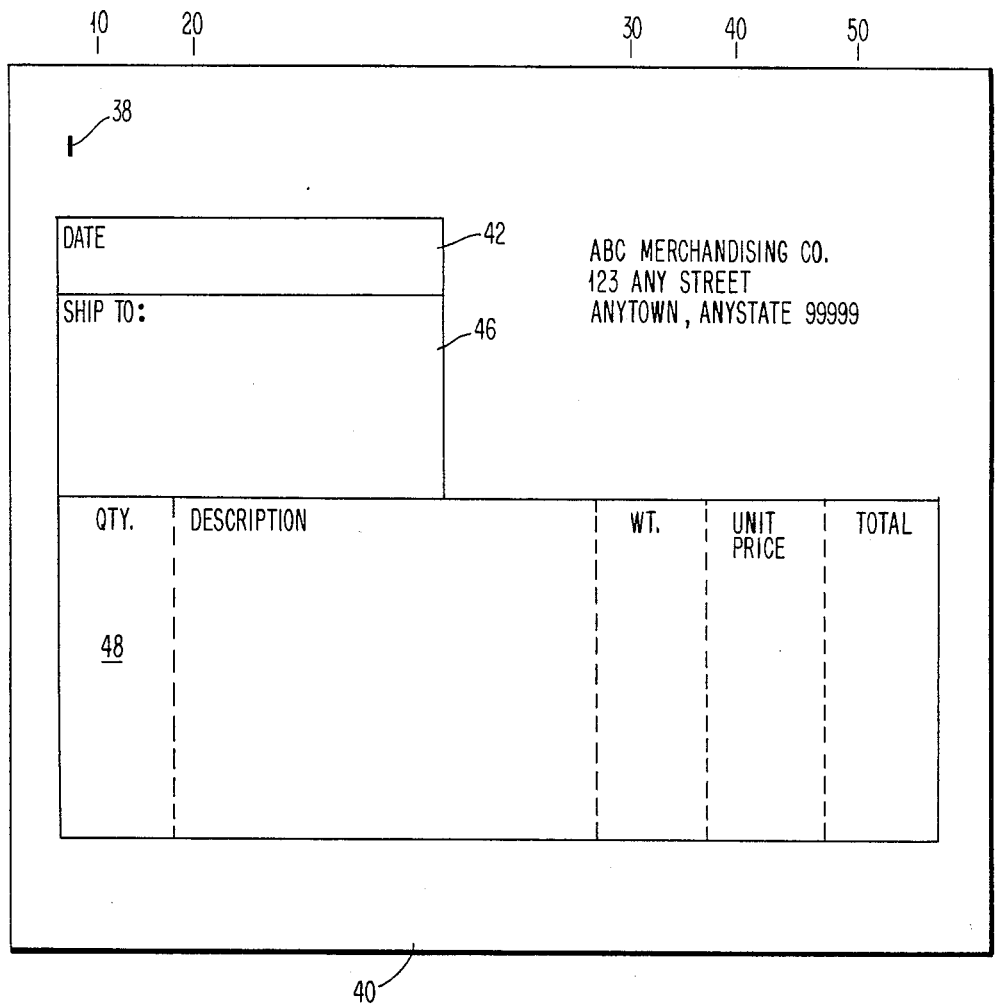
FIG. 5 is an illustration of an example form which may be filled out utilizing the voice prompting of the invention.

If a form is to be utilized in the typewriter and it is desired that voice prompts be utilized during the typing of the form, it is necessary to store the necessary printer movements and the prompts into a document storage 36. An example of such a form might be a shipping invoice 40 as illustrated in FIG. 5. The numbers across the top of the form indicate tabulation stop settings. Start mark 38 is preprinted on the form to provide a reference point over which the print point of the typewriter may be placed prior to loading the printer movement commands for the invoice 40 into document storage 36. Subsequent forms will likewise carry the start mark 38 to provide a start point for playout.

For purposes of an example, FIG. 6 contains the keystroke sequence the operator will cause to occur in order to store the necessary commands to operate the typewriter 10 and to cause the voice prompting for the shipping invoice 40 illustrated in FIG. 5. The typewriter 10 under the control of printer processor 20 controls and executes movement of the print point or display point relative to the record sheet 13.

The convention of illustration contained in FIG. 6 is as follows: the use of two separate keystrokes simultaneously are indicated by a plus sign between the two designators, i.e. STORE+1 indicates the depression of the STORE key and the number 1 key simultaneously, the illustration of a comma is to merely provide a separation between code inputs thereby indicating separate keystrokes; and the use of a lower case b with a / therethrough indicates a blank or space.

With the invoice 40 illustrated in FIG. 5 loaded into typewriter 10 and the print point positioned over start mark 38, a STORE key 30 depression and a simultaneous 1 key 32 depression will open the document storage 36 and place all subsequent keystrokes in a segment of storage identified by the number 1 in the document storage 36 of the text processor 16.

Three consecutive carrier returns designated by the code CR in FIG. 6 are then keyed to position the print point in the block 42 indicated for the date. At this point, the operator wishes to stop the printer from performing any additional functions and to cause the typewriter 10 to vocalize, through speaker 28, a prompt so that the operator will not need to look at the form but will be assured that the print point of printer 18 is positioned over the date block 42 of form 40. To accomplish this, an annotated stop code is entered through the keyboard into the keyboard processor and text processor by the depression of the code key 44 and the number 9 key 32. By entering the code +9 through the keyboard 12, the text processor 16 recognizes that the printer 18 and printer processor 20 are to be temporarily disabled and that the text processor 16 is to receive key inputs from the keyboard 12 which will then be stored in the annotation buffer 22 and subsequently used as the input to the voice synthesizer 24. In this case, the operator wishes that the date be inserted in the date block 42 and wants to be prompted by the word "date". To accomplish the loading of the prompt, the letters D A T E are keyed on their appropriate keys 33 of the keyboard 12 and thereby pass through keyboard processor 14 to the text processor 16. The termination of the annotation (date) is accomplished by a carrier return. The text processor is conditioned to terminate the annotation upon the next carrier return received thereafter and to interpret it only as a termination code for the annotation.

After the annotation has been terminated, it is necessary to position the print point in the "ship to" block 46 (FIG. 5). This is accomplished by one additional carrier return which will move the print point from the "date" block 42 to the "ship to" block 46 and position the print point at the left margin which has been set at column 10. At this point, the operator desires to enter the next prompt and keys simultaneously the CODE key 44 and the number 9 key 32. As this did previously, it causes the text processor 16 to disable the printer processor 20 and to accept subsequent keystrokes for loading into the annotation buffer 22 which will subsequently be used to control the voice synthesizer 24. After the annotated stop code (CODE +9) has been entered, the letters S H I P, space, T O are entered through keyboard 12. A carrier return terminates the annotation. At this point, further positioning commands are given to the typewriter 10 through keyboard 12 to position the print point in the "quantity" block 48. Similar prompt commands are entered for "quantity", "description", "weight", "unit price" and "total", at the respective locations on form 40 at which the operator wishes the prompt to be vocalized.

Should the operator desire to be prompted on subsequent lines so that multiple items and appropriate quantities, weights, etc. could be entered and the operator be prompted on each line for each input, additional prompts can be coded for each line or, alternatively, document 1 could be terminated after the ship to prompt and document 2 then be loaded to contain all the prompts necessary for the entries of "quantity", "description", "weight", "unit price" and "total". The operator could then merely key the command to play out document 2 repetitively as many times as desired for each form by pushing the PLAY key 34 and the number 2 numeral key 32.

After the operator has loaded and stored the commands and prompts in document 1 and has inserted a new form and positioned the print point of the typewriter 10 over the start mark 38, the contents of document 1 will then be sequentially accessed and played out by depressing PLAY +1. The contents of document 1 are illustrated in FIG. 7 in an abbreviated form.

To better understand the sequence of playback, reference should be made to FIG. 8. The lefthand portion of FIG. 8 will contain illustrations of the operator entered keystrokes or what the operator types and the righthand portion of FIG. 8 will illustrate the machine response.

Recalling that the print point is properly positioned over the start mark 38, the operator will then depress the PLAY key 34 and the number 1 key 32 simultaneously and the text processor 16, in response to the data provided it by processor 14, will then cause the printer processor 20 to accomplish three carrier returns and then to stop the printer 18 and send the contents of the first annotation following the annotated stop code from the annotation buffer 22 to the voice synthesizer 24. This will result in the word DATE being verbalized through speaker 28.

At this point, the operator having been prompted that the date is the desired input will then key, for example, 6/1/84 and the text processor 16 receiving inputs from the keyboard processor 14 will provide control signals to printer processor 20 to cause it to command the printer 18 to print 6/1/84. At this point, the typewriter will stop and not perform any other function until commanded to do so. Wishing to continue the playout of the stored document, the operator then will depress PLAY key 34 and a carrier return will then be accomplished by the printer in response to commands from the text processor 16 passed through and further processed by the printer processor 20. At this point, the text processor 16 will retrieve from the document memory 36 the prompt to be vocalized and will cause the prompt "SHIP TO" to be passed from the annotation buffer 22 to the voice synthesizer 24. Voice synthesizer 24 will then accept the code representation of "SHIP TO", process it and command the speaker 28, over line 26, to resonate in such a manner that the words "SHIP TO" are recognizable to the operator. The example may be continued with the operator then keying into keyboard 12 the appropriate shipping destination and that information printed by printer 18 in response to the keyboard processor 14, text processor 16 and printer processor 20 performing their sequential functions and outputting the appropriate character selection and escapement commands to printer 18. Continuing, the operator will then press the PLAY button or key 34 to continue through the stored document.

TEXT ENTRY, PLAYBACK

Figure 2:
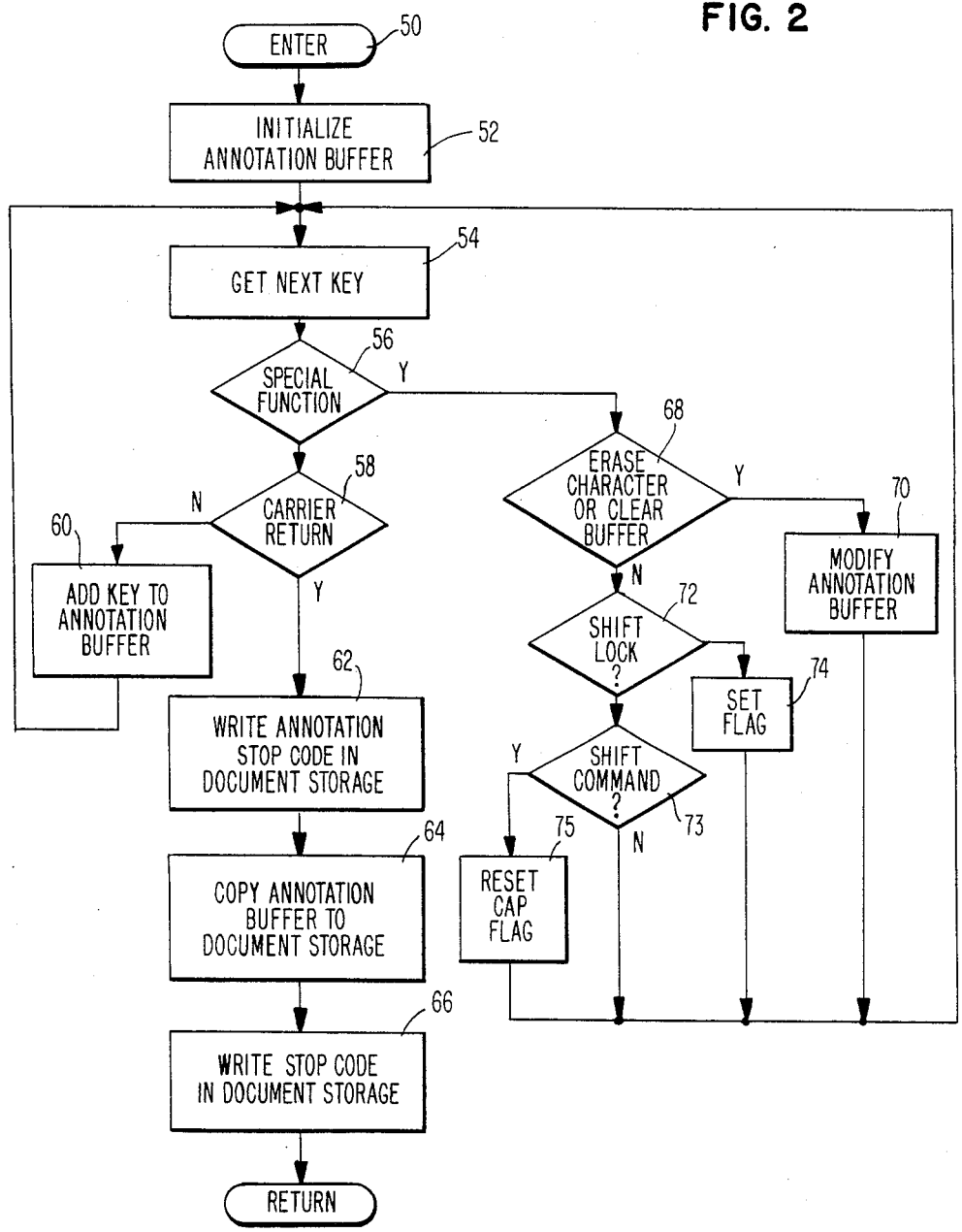
FIG. 2 is a flow chart of a subroutine for causing the storing of an annotated stop code in such a way that when recalled the annotated stop code will form the basis of the command for the voice synthesizer.
Figure 3:
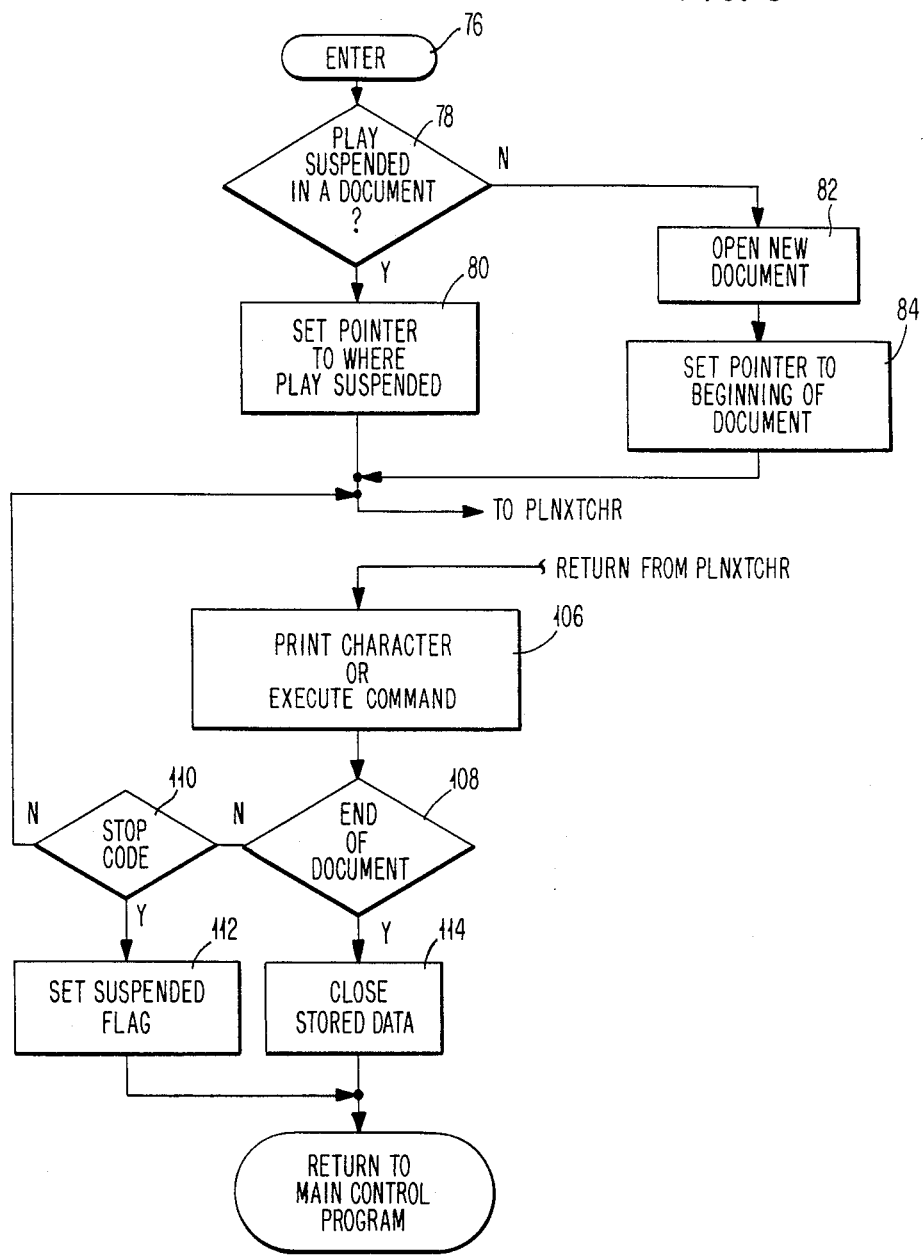
FIG. 3 is a flow diagram of a subroutine for playing back the stored phrase including the annotated stop code previously stored.
Figure 4:
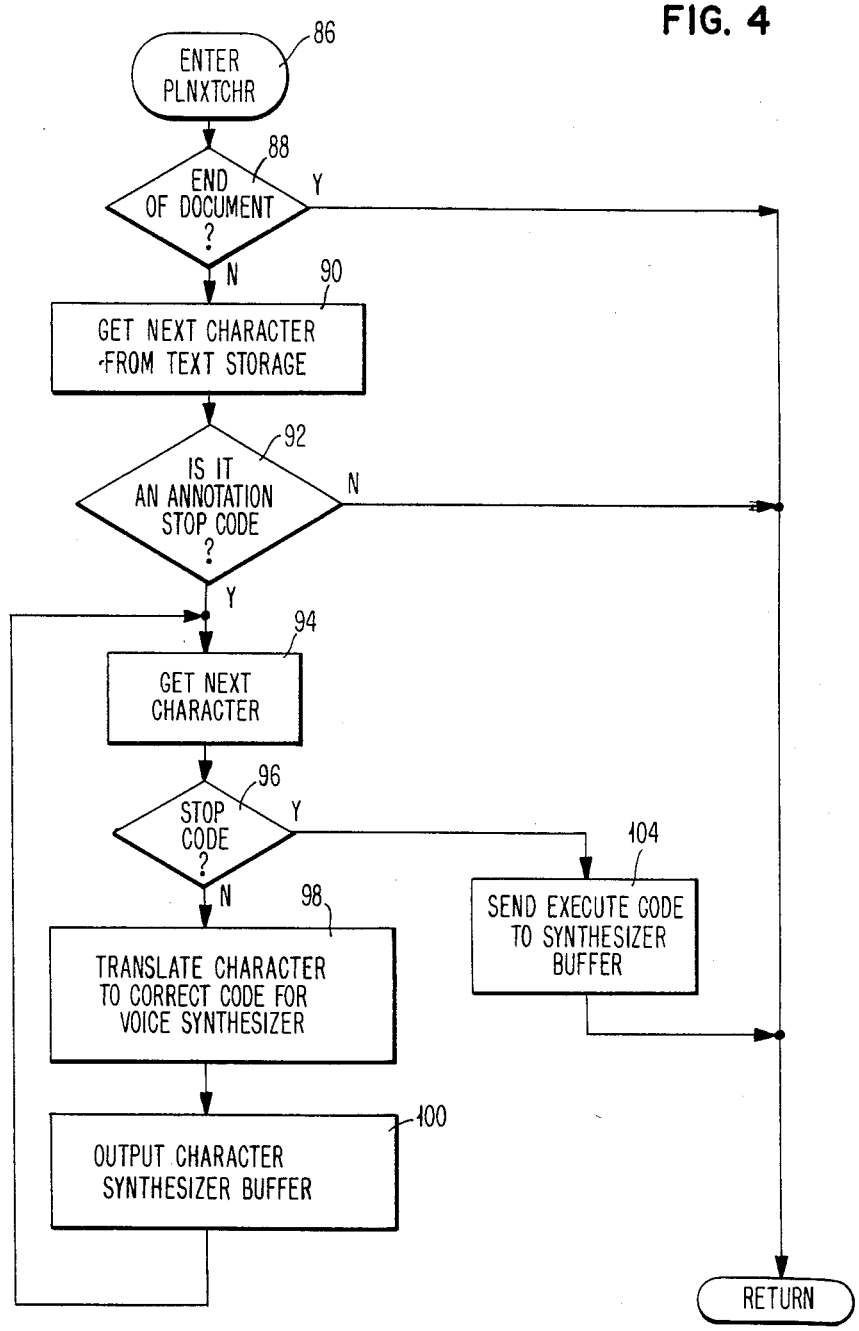
FIG. 4 is a subroutine to get and play the characters stored in the phrase storage on a character-by-character basis.

To better understand the detailed workings of the text processor, during the phase of operations when an annotated stop code and the annotations associated therewith are being stored and retrieved, reference is made to the flow diagrams in FIGS. 2, 3 and 4 and a program listing in Appendix A for implementing the flow diagrams. The program listing is in PL/S programming language. The PL/S programming language is described in *Guide to PL/S II,* copyrighted 1974 by International Business Machines Corp., Document Number GC28-6794. The typewriter, for the sake of example, is assumed to be in the condition where a phrase is being stored (the operator has depressed the STORE key 30 and a number key 32 to open a storage segment in document storage 36). Keystrokes may or may not have been entered from the keyboard to store either movement or characters.

Upon the depression of the CODE key 44 and the number 9 key 32 simultaneously, the routine illustrated in FIG. 2 is entered at 50. Upon entry into the routine depicted by the flow diagram in FIG. 2, the annotation buffer 22 is initialized or cleared from any previous contents at 52 and the next keystroke is then captured at 54. Upon the capturing of a keystroke at 54, the code representing that key is decoded to determine whether the key is a special function command at 56. Special function commands include non-graphic keys such as play, erase, delete, etc. If the keystroke is not a special function command, the flow diverts to decision block 58 wherein a determination is made as to whether the code represents a carrier return. If the code does not represent a carrier return the code representing the keystroke previously captured at 54 is then loaded or added into the annotation buffer 22 at 60 and the flow loops back to reenter the flow immediately prior to block 54. Upon reentry, the next keystroke is captured and a similar determination made and the looping continued as previously described until such time as the keystroke is determined to represent a carrier return at 58. At this point, the text processor 16 will then write an annotated stop code into document storage 36 at 62 in FIG. 2 and follow that function with copying the annotation buffer contents to the document storage at 64 followed by the writing of a stop code in the document storage at 66 and a return to the main text processor program. If during the preceding flow, a special function such as play, erase, delete, etc. is determined to be the function represented by the keystroke which was captured at 54 and that determination made at block 56, a further decision is made at block 68 as to whether it is a command to erase the last character or clear the annotation. If the determination is that the command is to erase the last character or clear the annotation, then the contents of the annotation buffer 22 are appropriately modified at 70 and the flow looped back and reenter the main flow prior to block 54. If the command is not to erase the last character or clear the annotation, then a decision is made as to whether it is a shift lock command at block 72 and, if not, the flow proceeds to 73 where the keystroke is tested to see if it is a shift command. If not, the flow loops back and reenters the flow prior to 54. If the key stroke was a shift command, then the cap flag is reset at 75. If the command represents a shift lock command, then the flow diverts to block 74 wherein the capitalization flag is set. Flow reverts back to the main flow of the flow diagram prior to block 54 from blocks 73, 74, 75.

Upon the receipt of a carrier return, the entire storing process is completed. The annotation buffer 22 contents is then transferred to the document storage 36 and a stop code is written into the document storage 36 at that point to effect the stopping of the typewriter 10 to allow variable data to be input by the operator through keyboard 12 on playback. The return then passes control of the typewriter 10 to the main control program of text processor 16 for further typing.

DOCUMENT PLAYOUT

When the play key 34 is depressed simultaneously with a numeral key 32 effecting the playout of a previously stored document, the routine depicted in the flow diagram in FIG. 3 is entered at 76. Upon entry at 76 from the main control program as shown in FIG. 3, determination is made as to whether play has been suspended in a previous document at 78. In the event that play was suspended in a previous document, then a pointer is set to the point of play suspension at 80. If play was not in progress in a document and therefore not suspended, then a new document is opened at 82 and a pointer set at the beginning of that document at 84. The flow of the logic from either blocks 80 and 84, as appropriate, is directed to 86 where the subroutine PLNXTCHR is entered at 86 in FIG. 4.

Upon entry at 86, the determination is made as to whether the signal being processed is an end of document indication and in the event that it is an end of document indication, then the remainder of the PLNXTCHR routine as illustrated in FIG. 4 is completely bypassed and the flow returns to FIG. 3. If the code is not an end of document as determined in block 88, then the next character is fetched from text storage 36 at 90.

The character code being fetched from text storage 36 at 90 is then processed to determine if it is an annotated stop code at 92. If it is not an annotated stop code, then the flow branches to return to FIG. 3. If the code is an annotated stop code as determined at 92, indicating a voice prompt, then the next character is fetched from memory at 94 and a determination made as to whether that character is a stop code 96. If the character is not a stop code, then the character is translated to the proper code for the voice synthesizer 24 at 98 and the correct code is then outputted to the synthesizer buffer 22 for storage at 100. The flow then diverts back to just prior to block 94 and forms a loop which will then continue to process and fetch characters and store them in the synthesizer buffer 22 in appropriate form until one of the character codes is determined to be a stop code at 96. Upon determining that a stop code exists at 96, the flow branches to 104 where an execute code is sent to the synthesizer buffer 22 to cause the synthesizer 24 to vocalize the sounds representing the contents of the buffer 22. Thereupon, the flow will then return to FIG. 3 and proceed to block 106 wherein the character is then commanded to be printed or a command is executed for a non-printing function.

The code which was printed or executed is then analyzed at decision block 108 and if the code is not an end of document code, it is further analyzed to determine whether it is a stop code at 110. Assuming that the decision 110 is negative, then the flow branches back to reenter the flow immediately downstream from blocks 80 and 84 and then branches to the PLNXTCHR routine shown in FIG. 4 and operates as previously explained.

If the data was determined to represent a stop code at block 110, then a flag indicating a suspension is set in block 112 and the flow then returns to the main control program of the text processor 16. This allows the operator to do such thins as text entry, editing, adding, deleting, etc. while the text processor 16 is in control. If the data being analyzed is recognized to be the end of a document at 108, then the segment of document storage 36 devoted to that particular document is then closed in block 114.

Upon closing the segment of document storage 36 designated for the document being processed, the control is then returned to the main control program for further word processing.

The foregoing description describes how characters are keyed into a keyboard which normally will cause the typewriter to type the characters in a conventional manner. The flow diagrams illustrate how once the command of a code and a 9 key simultaneously are inputted into the keyboard 12, the text processor then diverts from the conventional electronic typewriter operation to one of storing a command, keyed from the keyboard 10, for subsequent use by a voice synthesizer 24 to vocalize the command word upon subsequent playout.

Appendix A is a source code listing of the portion of the typewriter programs which correspond to FIGS. 2, 3 and 4. This is an example of the type of program listing which may be used to implement the invention.

Figure 9:
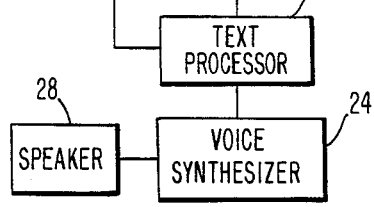
FIG. 9 is an illustration of a text processor terminal with the electronic controls depicted in block diagram form.

The program listing is in PL/S programming language. A word processor or text processing terminal as in Fig. 9 which comprises a keyboard 120, text processor 122, and a video display device 124 is equally capable of having this feature installed thereon. The display 124 has a character entry or display point 126 at which newly keyed characters are displayed. In all other respects, the device would operate the same as that described as a part of the typewriter.

The operation of the text processor 122 voice synthesizer 24 and speaker 28 identical to their respective counterparts in FIG. 1.

We claim:

1. An electronic keyboard entry and display device having a character display point comprising:
   means for encoding words descriptive of text segments to be associated with preselected positions of said display point on said display,
   means for generating audible tones understandable as said words responsive to said encoded words,
   said means for generating said audible tones responsive to the positioning of said display point in a predetermined manner in said preselected position by said electronic keyboard entry device, thereby audibly prompting an operator as to the proper text to be typed at said preselected position.

2. The electronic keyboard entry and display device of claim 1 wherein said means for encoding words comprises a keyboard for entering said words into said device.

3. The electronic keyboard entry and display device of claim 1 comprising a text memory and wherein said positioning of said display point in a predetermined manner comprises recalling from said text memory a sequence of commands for moving said display point.

4. The electronic keyboard entry and display device of claim 2 comprising a text memory and wherein said positioning of said display point in a predetermined manner comprises recalling from said text memory a sequence of commands for moving said display point.

5. The electronic keyboard entry and display device of claim 1 wherein said device comprises a typewriter and said display point being the typewriter print point.

6. An electronic typewriter, having an audible prompt aid, comprising:
   a keyboard for providing inputs to said typewriter,
   a printing means having a print point comprising a printer and a record feeding means, one moveable with respect to the other to effect movement of said print point over said record, said movements responsive to said keyboard inputs,
   an electronic control means for receiving signals from said keyboard and controlling said printing means and said record feeding means for controlling the movement of said print point, and for receiving character key input from said keyboard,
   selective, operator controllable, means on said keyboard for indicating to said electronic control means that said character key inputs represent descriptions of data associated with a predetermined location of said print point relative to said record,
   means for converting said character key inputs representing descriptions into audible forms of said descriptions upon the movement of said print point to said predetermined location to advise said operator of the description of the data to be supplied for said location on said record.

7. The electronic typewriter of claim 6 further comprising memory means for storing said signals in a sequence representing the required movements to position said print point at said predetermined location.

8. The electronic typewriter of claim 7 comprising means for playing from memory said signals in sequence to position said print point at said predetermined location.

9. The electronic typewriter of claim 8 wherein said means for converting is responsive to said means for playing, whereby said audible forms of said descriptions are created as said means for playing effects movement of said print point to said predetermined location.

10. A keyboard entry device having a display device for displaying characters entered at the keyboard, an entry point moveable relative to said display, comprising:
    means for moving said display point relative to said display under the control of and responsive to keyboard entry commands,
    means for recording a series of keyboard commands to control said means for moving,
    means for recording a series of keyboard commands representative of a description of data to be entered on said keyboard,
    means for replaying said two series of keyboard commands in the order recorded,
    voice synthesis means responsive to said second series of keyboard commands upon playback to vocalize said second series of keyboard commands such that the vocalization is understandable as a verbal prompt.

11. The keyboard entry device of claim 10 wherein said voice synthesis means comprises a predefined vocabulary.

12. The keyboard entry device of claim 10 wherein said voice synthesis comprises means to construct the vocalization in accord with speech rules and vocalizes without a predetermined vocabulary.

13. The keyboard entry device of claim 10 wherein said means for replaying is responsive to further keyboard commands.

14. An electronic keyboard entry device having an entry point at which characters are displayed,
    means for storing commands for controlling movement of said entry point,
    means for storing commands for defining prompt messages,
    means for initiating playback of both said commands and terminating said playback after playback of said second commands;
    means for vocalizing words in response to said played back second commands, and
    means for restarting said playback.

15. The device of claim 14 wherein said device is a typewriter and said entry point is the print point of said typewriter.

16. The device of claim 14 wherein said means for vocalizing words comprises means for constructing vocalizations from said prompt messages.

17. The device of claim 14 wherein said means for vocalizing words comprises means for selecting said words from a predetermined vocabulary.

18. An auditory prompting and entry scheme for key operator assistance in a memory containing system, comprising:
    operator input means including a keyboard for facilitating character and command input into a memory,
    an operating system to control the routing of characters and commands into and out of said memory, and to interpret and control the system in accordance with the commands given,
    means operative upon certain of said commands for encoding selected characters, and
    means for translating encoded selected characters into audible expressions, understandable as prompts,
    means operative upon a different command for effecting said translation of said encoded selected characters.

19. A method of entering prompts and auditoraly prompting to aid a key operator in a memory containing system, said system including operator input means including a keyboard, an operating system for controlling the memory containing system, comprising the steps of:
    inputting characters and commands into a memory,
    controlling by said operating system the routing of characters and commands into and out of said memory, and interpretting and controlling the system in accordance with the commands given, encoding, upon certain of said commands, selected characters, and
    translating encoded selected characters into audible expressions, understandable as prompts, and
    effecting said translation of said encoded selected characters upon receipt of a separate command.

20. The method of claim 19 wherein said steps of effecting said translation occurs upon receipt of a separate command routing said commands out of memory and said commands cause the conditioning of systems for operation to properly accept additional characters from said keyboard.

* * * * *